United States Patent
Sadanowicz et al.

(10) Patent No.: US 6,854,891 B1
(45) Date of Patent: Feb. 15, 2005

(54) BEARING ASSEMBLY FOR A VEHICLE

(75) Inventors: David Thomas Sadanowicz, Canton, MI (US); Larry William Brackmann, Brighton, MI (US); Don Paul Ward, Westland, MI (US)

(73) Assignee: Robert Bosch Corporation, Broadview, IL (US)

( * ) Notice: Subject to any disclaimer, the term of this patent is extended or adjusted under 35 U.S.C. 154(b) by 41 days.

(21) Appl. No.: 10/630,953

(22) Filed: Jul. 30, 2003

(51) Int. Cl.[7] .............................................. F16C 19/38
(52) U.S. Cl. ........................................................ 384/448
(58) Field of Search ................................ 384/448, 446, 384/589; 327/174, 173

(56) References Cited

U.S. PATENT DOCUMENTS

| | | | |
|---|---|---|---|
| 5,011,302 A | 4/1991 | Mott et al. | ................... 384/448 |
| 5,129,741 A | 7/1992 | Deane | ......................... 384/448 |
| 5,624,192 A * | 4/1997 | Rigaux et al. | .............. 384/448 |

* cited by examiner

*Primary Examiner*—Lenard A. Footland
(74) *Attorney, Agent, or Firm*—Leo H McCormick, Jr.; Warren Comstock

(57) ABSTRACT

A corner module for use in a motor vehicle having a bearing pack through which a wheel hub for the motor vehicle is connected with a support member. The bearing pack includes an inner race and an outer race for retaining first and second roller elements such that a wheel attached to the hub may rotate with respect to the support member. The bearing pack is characterized by an exciter ring that is located between the first and second roller elements and the outer race is characterized by an opening that is in radial alignment with the exciter ring. A sensor that is fixed to the support member has a functional length and a sensing area that extends through the radial opening in the outer race and into the bearing pack to a position adjacent the exciter ring such that the functional length and sensing area is protected from exposure to contamination that may be present in the environment. The sensing area is activated by movement of the exciter ring to provide an electronic control unit with a signal relating to the rotation of the wheel and used in the control of an anti-skid brake system.

14 Claims, 1 Drawing Sheet

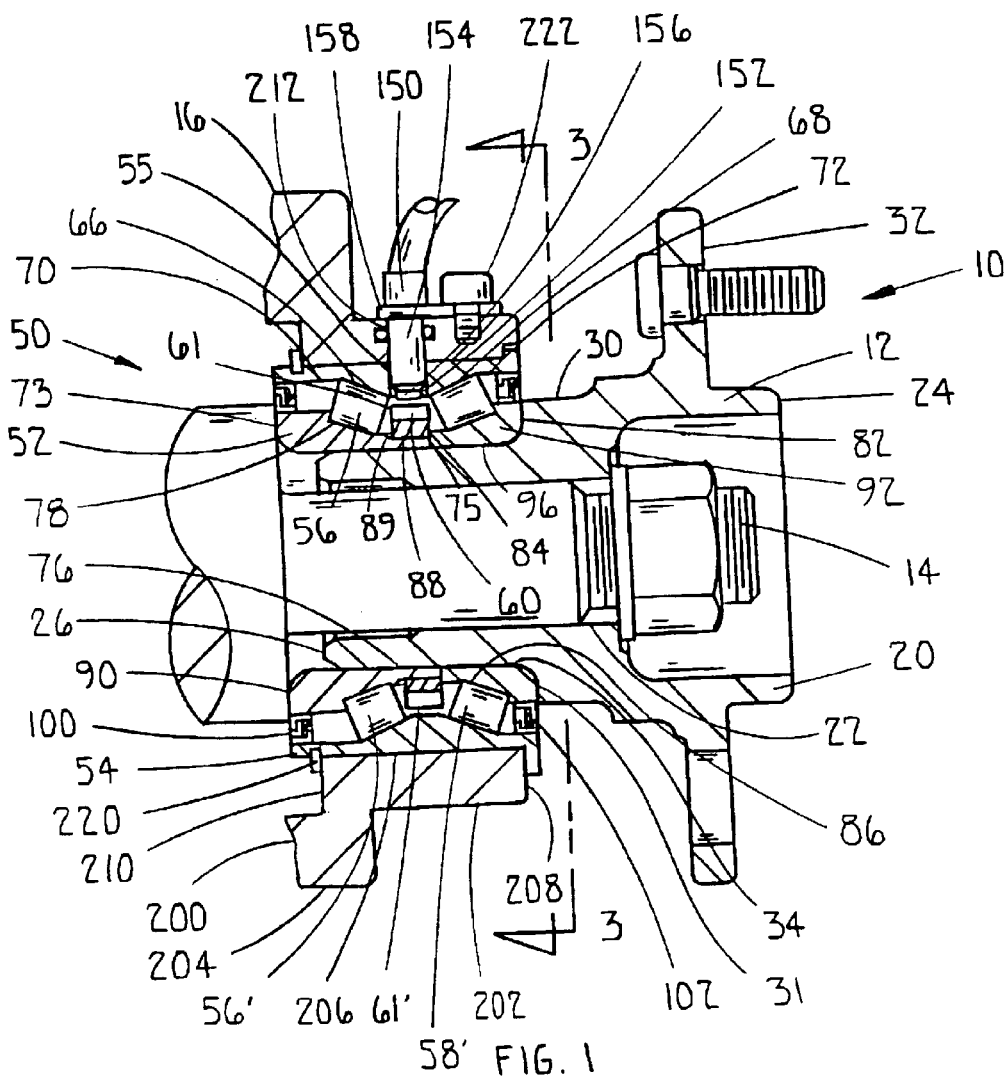
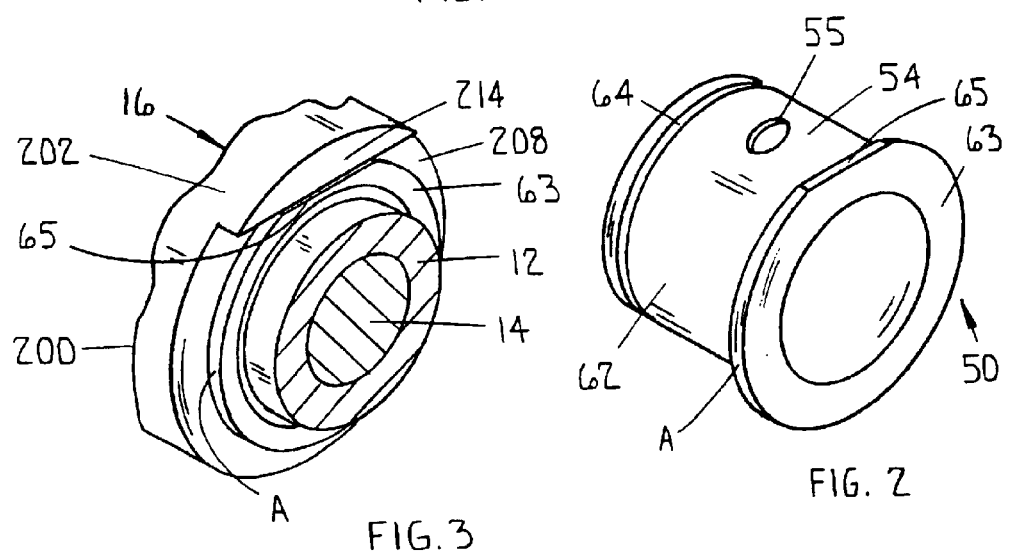
FIG. 1
FIG. 3
FIG. 2

BEARING ASSEMBLY FOR A VEHICLE

This invention relates to a bearing pack through which a wheel hub is connected to a support member wherein a tone wheel or magnetic encoder is retained in the bearing pack and activates a sensor to provide an electronic control unit with a signal corresponding to rotative movement of the hub.

BACKGROUND OF THE INVENTION

Most brake systems for cars and trucks currently have the capability of including anti-skid functions to prevent wheel lock from occurring during a brake application. In such systems, sensors are commonly located at each wheel to detect wheel rotation and when a potential lock up may occur, a signal is sent to an electronic control unit such that the pressure presented to the individual wheel brake is modulated and as a result wheel lock up may be avoided. The types of sensors used in a brake system vary and can be selected from a variety of devices such as variable reluctance devices commonly referred to as a passive sensors, Hall effect devices, AMR effect devices, GMR effect devices commonly referred to as active sensors, etc. . . . A sensor is usually activated by a magnetic field coupling relationship through some type of exciter ring, slotted disc, magnetized encoder, or other component that rotates with the wheel. The space relationship between the sensor and the activator is an important feature as disclosed in U.S. Pat. Nos. 5,011,302 and 5,129,741 wherein the tone wheel is respectively located on the hub adjacent to the sensor. This type of relationship is satisfactory for most applications, but under some circumstances it may be possible to damage or obstruct the sensor and exciter and as a result the signal sent to the electronic control unit might be inaccurate in controlling a brake application.

SUMMARY OF THE INVENTION

A primary object of this present invention is to provide a vehicle with a corner module wherein an exciter ring for a sensor is retained inside of a bearing pack located between a hub and a support member.

The corner module is defined by a bearing pack through which a wheel hub for the motor vehicle is connected with a support member. The hub has a cylindrical body with an axial bore that extends from a first end to a second end for receiving an axle for the motor vehicle, a peripheral surface with a radial flange adjacent the first end for affixing a wheel thereto and a cylindrical mounting surface located between the second end and the radial flange. An inner race for the bearing pack is located on the cylindrical mounting surface and fixed to the hub while an outer race for the bearing pack is fixed in an axial opening in the support member. The inner race and outer race retain first and second roller elements while an exciter ring is secured to the inner race and located between the first and second roller elements. The outer race has a first radial opening therein that is in alignment with the exciter ring, said outer race being located in a second axial bore in a support member integral with the said motor vehicle while the first radial opening is aligned with a second radial opening in the support member. A sensor that is fixed to the support member has a functional length and a sensing area that extends through the first and second radial openings into the interior of the bearing pack to a position adjacent the exciter ring. The sensing area is activated by movement of the exciter ring to provide an electronic control unit with a signal relating to the rotation of the wheel of the vehicle.

An advantage of this invention resides in the protection that a bearing pack provides an exciter ring and the functional length and sensing area of a sensor of a brake system.

An object of this invention is to provide a bearing pack with an exciter ring attached to an inner race and located between first and second roller elements while being aligned with a radial opening in an outer race of the bearing pack.

BRIEF DESCRIPTION OF THE DRAWINGS

FIG. 1 is a sectional view of a corner module that includes a bearing pack that is located between a hub and support member in accordance with the present invention;

FIG. 2 is a perspective view of the bearing pack of FIG. 1; and

FIG. 3 is a sectional view taken along lines 3—3 of FIG. 1.

DETAILED DESCRIPTION

The corner module 10 for use in a motor vehicle shown in FIG. 1 has a bearing pack 50 through which a hub 12 located on an axle 14 for the motor vehicle is connected with a support member 16. The bearing pack 50 includes a unitary outer race 54, see FIG. 2, and first 90 and second 92 cones that define an inner race 52. The bearing pack 50 includes an inner race 52 and outer race 54 for retaining first 56 and second 58 roller elements that allow the hub 12 to rotate with respect to the support member 16. The bearing pack 50 has an exciter ring 60 that is located between the first 56 and second 58 roller elements such that the exciter ring 60 is radially aligned with an opening 55 in the outer race 54. A sensor 150 that is fixed to the support member 16 has a cylindrical body with a functional length and sensing area 152 that extends through the radial opening 55 in the outer race 54 and into the interior of the bearing pack 50 to a position adjacent the exciter ring 60 and as a result the functional length and a sensing area 152 is protected from exposure to contamination that may be present in the environment. The sensing area 152 is activated by movement of the exciter ring 60 to provide an electronic control unit, not shown, with a signal relating to the rotation of a wheel attached to hub 12 to provide an input used in controlling an anti-skid brake system.

In more particular detail, the hub 12 has a cylindrical body 20 with an axial bore 22 that extends from a first end 24 to a second end 26 for receiving axle 14 for the motor vehicle. The cylindrical body 20 has a peripheral surface 30 with a radial flange 32 adjacent the first end 24 for affixing a wheel thereto and a cylindrical mounting surface 34 that is located between the second end 26 and a shoulder 31 adjacent the radial flange 32 for receiving the inner race 52 of the bearing pack 50.

The support member 16 as illustrated in FIGS. 1 and 3 is defined by a member 200 with a annular rib 202 that extends from a support 204 that is attached to the vehicle. Flange 202 has an axial bore 206 that extends from a first end 208 to a second end 210. Flange 202 has a radial opening 212 that extends into the axial bore 206 and a bearing or abutment face 214 that extends past the first end 208 of member 200.

The unitary outer race 54 has a cylindrical body 62 with a flange 63 on a first end and a groove 64 adjacent a second end of its peripheral surface and an inner surface with first 66 and second 68 tapered or sloping raceways which respectively extend from ledge surfaces 70 and 72 the ends. The flange 63 has a flat 65 that forms a chord such that the axis of radial opening 55 is located along a plane that is perpendicular to the flat 65. The first 66 and second 68 tapered or sloping raceways are symmetrically positioned with respect to the axis of opening 55 that forms a reference point along the inner surface of the outer race 54.

The first cone 90 of the inner race 52 has a first outer face 73 separated from a first inner face 75 by an outer peripheral surface 74 and an inner surface. The inner surface includes a tapered or sloping raceway 78 located between a ledge or thrust surface and a guide surface with a dimensionally controlled surface 88 that is located on the inner surface adjacent the inner face 75. The tapered or sloping raceway 78 is designed to be parallel or complementary with the tapered or sloping raceway 66 in the unitary outer race 54. Similarly, the second cone member 92 has a second outer face 82 separated from a second inner face 84 by an outer peripheral surface 96 and an inner surface. The inner surface includes a tapered or sloping raceway 86 that is located between a ledge or thrust surface and a guide surface. The guide surface 88 receives the exciter ring 60 to align a plurality teeth 61, 61' . . . 61$^n$ on the peripheral surface thereof with respect to the radial opening 55 in outer race 54.

The inner race 52 and outer race 54 retain the first plurality rollers 56,56', . . . 56$^n$ in a first row and second plurality rollers 58, 58' . . . 58$^n$ in a second row while the first and second rows are retained or aligned between the outer race 54 and the first 90 and second 92 cones by holders or cages to provide uniform spacing of the rollers around the periphery of the races. Seals 100,102 are respectively located between the inner 52 and outer 54 races to complete the assembly of the bearing pack 50.

The cylindrical body 62 of the outer race 54 is inserted in the axial bore 206 in the flange 202 of the support member 16 until flange 63 engages end 208 and flat 65 is aligned with bearing or abutment face 214 to align opening 55 with opening 212. The engagement of flat 65 with bearing or abutment surface 214 on the support member 16 results in opening 55 being aligned with opening 212 in the annular rib 202 of support member 16. While a frictional engagement may occur between cylindrical body 62 and flange 202 in order to assure that the outer race 54 remains in axial bore 206, a snap ring 220 is located in groove 64. Thus, the outer race 54 is axially and rotatively fixed with respect to support member 16.

Sensor 150 has a cylindrical body 154 that retains a sensing area 152 that is inserted into opening 212 in support member 16 and opening 55 in the outer race 54. The reading surface 156 of the sensing area 152 is located in the interior of the bearing pack 50 in a position adjacent the exciter ring 60 when projection 158 is secured to flange 202 by screw 222. The sensing surface 152 is the area by which the teeth of the target wheel, or magnetic encoder, 60 rotate past thus generating a magnetic field that is detected by sensor 150. The signal generated is proportional to the rotation of the exciter ring 60 and the wheel of the vehicle and transmitted to the electronic control unit for the vehicle as an input to control the braking of the wheel.

The size of opening 55 in outer race 54 is larger than opening 212 in support member 16 such that the cylindrical body 154 supporting sensing area 152 is not damaged should the outer race 54 rotate an amount with respect to the engagement relationship between surface 65 and projection 214.

We claim:

1. A hub and bearing assembly for use in a motor vehicle having a brake system comprising:

a hub having a first axial bore that extends from a first end to a second end for receiving an axle for the motor vehicle, a peripheral surface with a radial flange adjacent said first end for affixing a wheel thereto and a cylindrical mounting surface located between said second end and said radial flange;

a bearing pack having an inner race and an outer race for retaining first and second roller elements with an exciter ring fixed to said inner race and located between said first and second roller elements, said inner race being located on said cylindrical mounting surface and fixed to said hub, said outer race having a first radial opening therein in alignment with said exciter ring and being located in a second axial bore in a support member integral to said motor vehicle, said outer race being retained in said support member by a ring located in a groove in said outer race such that said first radial opening is aligned with a second radial opening in said support member; and a sensor fixed to said support member and having a cylindrical body with a functional length and a sensing area that extends through said first and second radial openings and into said bearing pack to a position adjacent to said exciter ring, said sensor being activated by movement of said exciter ring to provide an electronic control unit with a signal relating to the rotation of said wheel.

2. The hub and bearing assembly as recited in claim 1 wherein said outer race is further characterized by a flange with a chord surface thereon that engages a projection on said support member to prevent said outer race from rotating.

3. The hub and bearing assembly as recited in claim 2 wherein said first radial opening that receives said functional length and sensing area is larger than said second radial opening in said support member to provide a measure of tolerance to prevent damage of said functional length and sensing area should said outer race rotate.

4. The hub and bearing assembly as recited in claim 3 wherein said sensor is sealed in said second radial opening and said functional length and sensing area is sealed in said bearing pack such that said functional length, sensing area, and exciter ring are protected from any environmental contamination that may be present.

5. The hub and bearing assembly as recited in claim 4 wherein said exciter ring is defined by a magnetic encoder, and said sensing surface is the area where the magnetic field change is applied and said signal is a magnetic field change conversion corresponding to the rotation of said wheel.

6. A corner module for use in a motor vehicle having a brake system, said corner module including a sensor and a bearing pack that is located between a hub and a support member, said hub being attached to a wheel of the vehicle and having a mounting surface adjacent to an end for receiving an inner race of said bearing pack, said support member having an axial opening therein for receiving an outer race of said bearing pack, said inner and outer races retaining first and second roller elements such that said wheel may rotate with respect to said support member, said bearing pack being characterized by an exciter ring that is fixed to said inner race and located between said first and second roller elements; said outer race being characterized by an opening that is in radial alignment with said exciter ring; and said sensor being characterized by being fixed to said support member with a functional length and a sensing area that extends through said opening in said outer race and into said bearing pack to a position adjacent said exciter ring, said sensing area being activated by movement of said exciter ring to provide an electronic control unit with a signal relating to the rotation of the wheel for use in controlling an anti-skid brake system.

7. The corner module as recited in claim 6 wherein said outer race is further characterized by a flange that engages said support member to align said exciter ring with respect to said functional length and sensing area.

8. The corner module as recited in claim 7 wherein said opening in said outer race is characterized by being larger than a cylindrical body of said functional length and sensing area to assist in locating said functional length and a sensing area within said bearing pack.

9. The corner module as recited in claim 8 wherein said outer race is further characterized by a peripheral groove adjacent to a first end for receiving an attachment member to axially retain said outer race within said axial opening in said support member.

10. The corner module as recited in claim 9 wherein said attachment member is a snap ring.

11. The corner module as recited in claim 10 wherein said support member is characterized by an annular rib that surrounds said axial opening, said annular rib having a second opening for receiving said functional length and sensing area of said sensor.

12. The corner module as recited in claim 11 wherein said second opening is sealed to prevent environmental contamination from entering said bearing pack and effecting information derived by said sensor.

13. The corner module as recited in claim 12 wherein said exciter ring is characterized by a magnetic encoder; said magnetic field change is characterized by a change in magnetic field and said signal is an emf corresponding to the rotation of said wheel.

14. The corner module as recited in claim 9 wherein said outer race is further characterized by having a chord on the first end that engages said support member to prevent said outer race from rotating with respect to said axial opening in said support member.

* * * * *